United States Patent [19]

Pearson, Jr. et al.

[11] Patent Number: 4,559,537

[45] Date of Patent: Dec. 17, 1985

[54] METHOD OF TRACKING TARGET IN PRESENCE OF CLUTTER

[75] Inventors: Earl C. Pearson, Jr., Watertown; William Nelson, Lexington, both of Mass.

[73] Assignee: Raytheon Company, Lexington, Mass.

[21] Appl. No.: 448,863

[22] Filed: Dec. 10, 1982

[51] Int. Cl.$^4$ .................. G01S 7/46; G01S 13/04
[52] U.S. Cl. .................. 343/7 A; 343/17.1 R
[58] Field of Search .................. 343/7 A, 7.7, 9

[56] References Cited

U.S. PATENT DOCUMENTS

| | | | |
|---|---|---|---|
| 3,707,718 | 12/1972 | Ames | 343/7.7 |
| 3,836,964 | 9/1974 | Evans | 343/7 A |
| 4,062,012 | 12/1977 | Colbert et al. | 343/7 A |
| 4,104,631 | 8/1978 | Weigle | 343/7 A |
| 4,119,966 | 10/1978 | Bouvier et al. | 343/7.7 |
| 4,217,583 | 8/1980 | Hiller et al. | 343/7 A |
| 4,450,446 | 5/1984 | Clancy et al. | 343/7.7 |

Primary Examiner—Thomas H. Tarcza
Assistant Examiner—Mark Hellner
Attorney, Agent, or Firm—Philip J. McFarland; Joseph D. Pannone

[57] ABSTRACT

A method of operating a Doppler radar to track a target when main beam clutter is present is shown to comprise the steps of: (a) forming, from all signals exceeding a predetermined amplitude that are received by the pulse Doppler radar during a predetermined period, a range/-Doppler matrix having NXM cells, where N is the number of range bins and M is the number of Doppler bins, with a digital one in any cell representative of a return signal with a given Doppler shift frequency from a reflector at a given range; (b) sequentially reading, in accordance with a predetermined program, the contents of the cells in the range/Doppler matrix to form digital numbers with digits indicative of the presence or absence of a reflector in adjacent cells; (c) comparing each digital number to a digital number representative of a target return signal; and (d) generating a frequency control signal when the comparison step indicates a target return signal to adjust a local oscillator in the pulse Doppler radar to effect tracking on the indicated target return signal.

1 Claim, 3 Drawing Figures

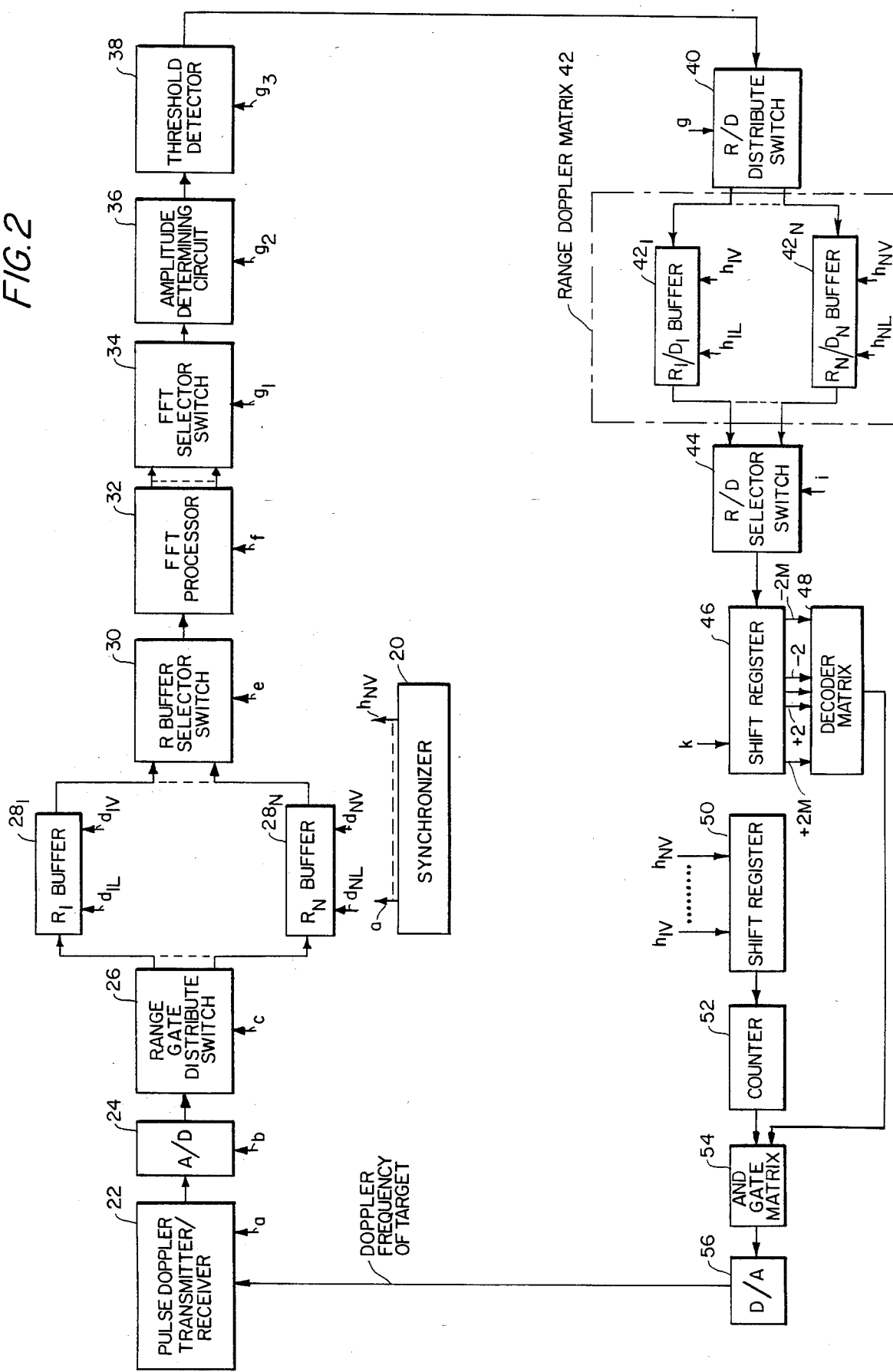

METHOD OF TRACKING TARGET IN PRESENCE OF CLUTTER

BACKGROUND OF THE INVENTION

This invention pertains generally to radar signal processing techniques, and, in particular, to an improved signal processing technique for enabling a low pulse repetition frequency (PRF) airborne radar to distinguish between target returns and returns from main beam clutter.

As is known, an aircraft intent on penetrating an enemy's airspace will fly at a very low altitude in order to avoid, or delay for the maximum possible time, detection by a ground-based enemy radar. Such penetrating aircraft may, however, be detected and interdicted by an interceptor aircraft utilizing a so-called "look-down, shoot-down" radar system which employs a forward and downward-looking radar beam. Generally, such radar systems employ a pulse Doppler radar operating at a relatively low pulse repetition frequency (PRF), with an antenna having a relatively small aperture. The problem of distinguishing between return signals attributable to main beam ground clutter and those from a moving target is encountered.

It is a common practice in operation of a pulse Doppler radar to change PRF and transmitted frequency from dwell to dwell so that in at least one dwell the problem of blind speeds is solved. Then, by range gating and passing all return signals through a Fast Fourier Transform (FFT) processor, target return signals and main beam clutter may be distinguished one from the other so that clutter frequency tracking loops and roughing filters may be controlled to reject the main beam clutter. Such loops and filters are, however, difficult to implement and are at times unreliable.

Another technique that may be used to separate main beam clutter from the target return signal is to calculate the ranges and Doppler frequencies at which main beam clutter should occur and then operate appropriate filters to reject any received signals that fall within the calculated ranges and Doppler frequencies. Such a technique, however, requires an accurate measurement of both attitude and velocity so that the accuracy of the requisite calculations may be maintained.

SUMMARY OF THE INVENTION

With the foregoing background of the invention in mind it is, therefore, a primary object of this invention to provide an improved signal processing technique, suitable for use in an airborne Doppler radar, for distinguishing target return signals from main beam clutter without requiring either the use of clutter tracking loops and roughing filters or accurate measurements of the attitude and velocity of the radar platform.

The foregoing and other objects of this invention are generally attained by processing all of the radar return signals in an FFT signal processor to arrange such returns into a range/Doppler matrix. Each cell in that matrix is compared to a threshold corresponding to a scaled mean of the background noise and a logic level one is placed in those cells that exceed the threshold, and, conversely, a logic level zero is placed in those cells that do not. With an appropriate PRF main beam clutter signals occur in many contiguous cells in such a matrix and target return signals occur in only a few isolated cells or in a single cell. The range-Doppler matrix is systematically examined to determine the Doppler frequency of the target return signals and such frequency is then impressed as a modulation signal on the local oscillator of the pulse Doppler radar so that tracking of the target return signals may be effected.

BRIEF DESCRIPTION OF THE DRAWINGS

Other objects and many of the attendant advantages of this invention will be readily appreciated as the same become better understood by reference to the following detailed description when considered in connection with the accompanying drawings, wherein:

FIG. 2 is a simplified block diagram of the pulse Doppler radar of FIG. 1; and

DESCRIPTION OF THE PREFERRED EMBODIMENT

Figures 1, 3:
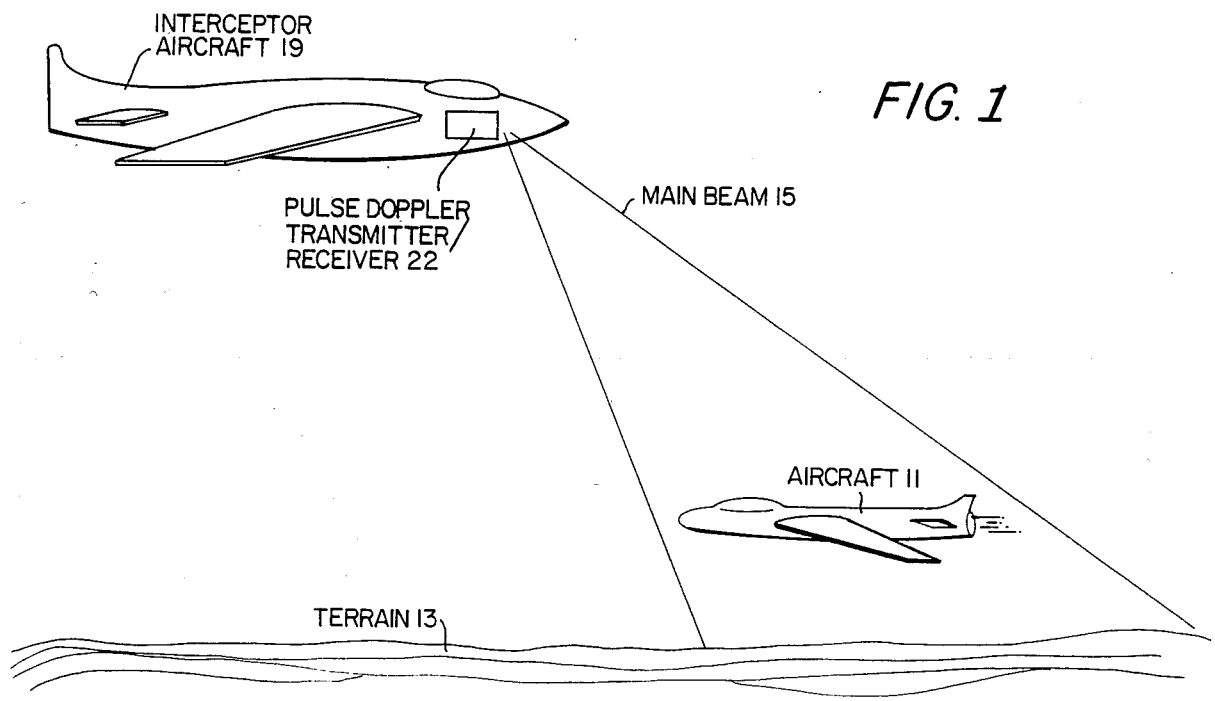
FIG. 1 is a sketch, somewhat simplified, illustrating how an airborne pulse Doppler radar according to this invention may be used to detect and interdict a penetrating aircraft.
FIG. 3 is a sketch of a range/Doppler matrix produced by the FFT signal processor of FIG. 2 that is useful in understanding the operation of the contemplated signal processing technique.

Referring now to FIG. 1, an exemplary tactical engagement is illustrated wherein an aircraft 11, flying at a relatively low altitude above the terrain 13 to penetrate an area, is illuminated by a main beam 15 transmitted from an interceptor aircraft 19. As may be seen, the radar beam 15 is relatively broad due mainly to the small aperture antenna (not shown) used with the pulse Doppler transmitter/receiver 22. As a result, a substantial portion of the terrain 13 also is illuminated by main beam 15, with the result that "main beam clutter" is detected by the pulse Doppler transmitter/receiver 22. Because of the extent of the illuminated terrain, the amplitude of the main beam clutter far exceeds that of the desired target return signals from the aircraft 11.

Before referring to FIG. 2 in detail, it will be noted that, because the invention here is directed to an improvement in the way in which signals detected by a conventional pulse Doppler radar are processed, many details of such radar not required for an understanding of this invention have not been shown. Further, it will be appreciated that the details of construction of the various elements shown in block form are within the knowledge of any person of skill in the art and need not be illustrated or described. For example, it is felt that the details of the master timing unit (the synchronizer) that controls operation of the various elements of the contemplated system need not be shown. It will also be appreciated that the architecture of the illustrated signal processor has been chosen for ease of illustration. That is to say, the basically serial mode of processing shown in FIG. 2 could easily be changed to a parallel mode of processing.

With the foregoing in mind it may be seen that a synchronizer 20 provides, over a line marked "a", trigger pulses and range gating signals to a pulse Doppler transmitter/receiver 22. Range-gated received signals from a target (not shown in FIG. 2) and main beam clutter (not shown in FIG. 2) are passed through an analog-to-digital converter (A/D 24) controlled by timing pulses "b". The resulting digital members, one for each one of N range gate, are passed, through a switching matrix designated "range gate distribute switch 26", to appropriate ones of N different shift registers, designated "$R_1$ buffer $28_1 \ldots R_N$ buffer $28_N$". "N" then is the number of range cells to be formed. Each one of such N different shift registers contains M stages, where M equals the number of Doppler cells to be formed. It will now be obvious that after NXM pulses have been transmitted and received, the shift registers making up the $R_1$ buffer $28_1 \ldots R_N$ buffer $28_N$ will all be filled as the lines marked $d_{1L} \ldots d_{NL}$ are sequentially actuated to shift digital numbers through each such register.

As soon as the $R_1$ buffer $28_1$ is filled, after (NXM-N) pulses, the contents of such buffer are shifted, through a switch, labeled "R buffer selector switch 30", to a Fast Fourier Transform, labeled "FFT processor 32". That processor then is operative in a conventional manner to produce M output signals in the form of complex digital words representative of the frequency spectrum of the range gated signals stored in the $R_1$ buffer $28_1$. Each one of the M output signals then (after passing through a selector switch, FFT selector 34 and an amplitude determining circuit 36) is passed to a digital comparator, i.e. threshold selector 38, wherein a comparison is made to a preselected threshold level. The signal out of the threshold detector 38 then is either: (a) a digital one, indicating that the amplitude of each one of the M outputs of the FFT processor 32 is higher than the amplitude of the preselected threshold level; or (b) a digital zero. The successively occurring digital ones and zeroes out of the threshold detector 38 are passed, through a switching arrangement labeled "R/D distribute switch 40", to a shift register labeled "$R_1/D_1$ buffer $42_1$".

It will now be evident that the process just described is repeated N times until the shift register labeled "$R_N/D_N$ buffer 42N" is filled. The contents of the $R_1/D_1$ buffer $42_1 \ldots R_N/D_N$ buffer $42_N$ constitute a range/Doppler matrix 42. An exemplary one of such a matrix is shown in FIG. 3 wherein the individual cells are numbered in a "first in - first out" manner. In FIG. 3, each one of the cells in which a digital one is stored is marked with an "X". A digital zero has no mark.

As may be noted in FIG. 3, target signals produce a relatively small group of digital ones in adjacent cells, while clutter signals produce a relatively large group of digital ones extending over many cells. Further, the orientation of the area in the range/Doppler matrix of representing clutter is determined by the orientation of the intercept of the main beam 15 (FIG. 1) with the terrain 13 (FIG. 1) relative to the velocity vector of the interceptor aircraft 19 (FIG. 1).

The differences between target signals and clutter in the range/Doppler matrix are used to distinguish between target signals and clutter and to produce an analog signal indicative of the Doppler velocity of a target. The logic of the distinguishing process is that if cells in the range/Doppler matrix containing digital ones are isolated from other cells containing digital ones, and if digital ones do not extend over more than two contiguous cells in the range/Doppler matrix, then a target is indicated. To implement such logic, the contents of the cells in the range/Doppler matrix are read in a programmed manner (here in a first in, first out manner) by being passed, via a switching arrangement labeled "R/D selector switch 44", to a shift register 46. That register here contains 4M stages. The center stage, the center stage ±2 stages and the first and the last stages are connected to a decoder matrix 48, here a digital comparator. It will be recognized that, starting from the left hand side of the shift register 46, the tapped stages produce the digital number 00100 whenever a "target" signal is read out of the range/Doppler matrix. Further, it will be recognized that: (a) the "no signal" condition is indicated by the digital number XXOXX (where X may be a digital one or a digital zero), and (b) the "clutter" condition is indicated by any digital number with a digital one in the center and a digital one in either the first or fifth place. It is evident, therefore, that the decoder matrix is arranged to produce a TARGET signal, i.e., a digital one, only when the digital number 00100 is formed by the selected stages of the shift register 46, with a $\overline{\text{TARGET}}$ signal, i.e., a digital zero, being formed in any other case.

It will be evident that, in addition to a TARGET signal, an indication of Doppler frequency must also be provided. Thus, the $h_{1V} \ldots h_{NV}$ signals utilized to unload the individual stages of the buffers ($R_1D_1$ buffer $42_1 \ldots R_{N/D}$ buffer $42_N$) are also applied to a shift register 50 having 2 M stages. With such register initially cleared, it is apparent that the pulses applied will appear in synchronism with the "signal" in the center stage of the shift register 46. Therefore, when successive signals out of the shift register 50 are applied to a counter 52, producing a maximum of M counts, the count indicated by such counter is a digital representation of the Doppler frequency of the cell producing a "signal" in the center stage of the shift register 46. The output of the counter 52 is applied, through an AND gate matrix 54 to which the signal from the decoder matrix 48 is also applied, to a digital-to-analog converter (D/A 56), finally to produce an analog signal representative of the Doppler frequency of a target. Such analog signal then is passed to the receiver in the pulse Doppler transmitter/receiver 22 to complete a tracking loop in a well known manner (not shown) so that tracking on a target is effected and the effect of clutter is eliminated as desired.

Having described a signal processor according to this invention, it will now be apparent that many changes may be made without departing from the inventive concepts. Thus, so long as the concept of processing all returns, whether from clutter or a target, is carried out to produce a range/Doppler matrix, many changes may be made. For example, it is evident that the FIRST IN - FIRST OUT approach to forming and reading the range/Doppler matrix need not be followed. That is to say, once the range/Doppler matrix is formed, "constant Doppler" cells could be read out sequentially rather than "constant range" cells as illustrated and described. Further, the criteria for distinguishing a target from clutter could be changed if the size of a target relative to the size of each range/Doppler cell were changed. Still further, it will be evident that framing zeroes could be inserted in the signals out of the range/Doppler matrix to increase the effective size of such matrix. It is felt, therefore, that this invention should not be restricted to its disclosed embodiment, but rather should be limited only by the spirit and scope of the appended claims.

What is claimed is:

1. In the operation of a pulse Doppler radar responsive to clutter and a target wherein a frequency tracking loop is incorporated, such loop including an oscillator operating at an adjustable frequency to provide a frequency tracking capability whereby only target return signals are tracked, the method of generating a control signal for the oscillator, such method comprising the steps of:

(a) forming, from all signal returns received during a predetermined period of time, a range/Doppler matrix having N×M cells, where N equals the number of range bins and M equals the number of Doppler bins at each range, a digital one in any one of the cells indicating a return signal and a digital zero indicating absence of a return signal;

(b) sequentially reading, in accordance with a predetermined program, the content of each one of the cells successively to form digital numbers from 4 M sequentially read cells, each digit in each one of such digital numbers being indicative of the presence, or absence, of reutrn signals in four successive range bins;

(c) comparing each five successively formed digits with a five digit reference digital number having a digital one as the center digit and a digital zero as the first and fifth digits to produce a gating signal only when the first, center and fifth of five successively formed digits in the successively formed digital numbers correspond with the five digit reference digital number;

(d) generating, in synchronism with each successively formed digital number, a frequency control signal representative of the Doppler frequency of a selected cell; and (e) passing the frequency control signal extant with the gating signal to the oscillator to control the frequency thereof.

* * * * *